United States Patent
Angel et al.

[11] Patent Number: 6,027,285
[45] Date of Patent: Feb. 22, 2000

[54] MAT INSTALLATION

[75] Inventors: Thomas M. Angel, Houma; Robbie Boudreaux, Montegut, both of La.

[73] Assignee: Submar, Inc., Houma, La.

[21] Appl. No.: 08/985,843

[22] Filed: Dec. 5, 1997

[51] Int. Cl.[7] .................. E02B 3/12; F16L 1/12
[52] U.S. Cl. ..................... 405/172; 405/16; 405/19; 405/158
[58] Field of Search ................ 405/172, 17, 16, 405/19–21, 29, 30, 31

[56] References Cited

U.S. PATENT DOCUMENTS

| | | | |
|---|---|---|---|
| 687,389 | 11/1901 | Wilhelmi | 405/172 X |
| 3,086,369 | 4/1963 | Brown | 405/172 |
| 4,184,788 | 1/1980 | Colle | 405/19 |
| 4,375,928 | 3/1983 | Crow et al. | 405/17 X |
| 4,407,606 | 10/1983 | Larsen . | |
| 4,469,468 | 9/1984 | Larsen . | |
| 4,477,206 | 10/1984 | Papetti et al. | 405/172 |
| 4,919,567 | 4/1990 | Sample | 405/17 X |
| 5,193,937 | 3/1993 | Miller . | |
| 5,443,329 | 8/1995 | De Geeter | 405/172 |
| 5,449,020 | 9/1995 | Matiere . | |
| 5,476,343 | 12/1995 | Sumner . | |
| 5,507,594 | 4/1996 | Speicher | 405/19 X |

FOREIGN PATENT DOCUMENTS

| | | |
|---|---|---|
| 2735135 | 7/1977 | Germany . |
| 7707168 | 6/1977 | Netherlands . |
| 962713 | 10/1982 | Russian Federation . |
| 1558427 | 1/1980 | United Kingdom . |
| 2084286 | 4/1982 | United Kingdom . |

*Primary Examiner*—Dennis L. Taylor
*Attorney, Agent, or Firm*—Wendy Buskop; Bayko Gibson et al.

[57] ABSTRACT

A mat installation is disclosed which reduces shoreline deterioration due to wave and tide surging, comprising a series of concrete elements, disposed over a set of pipes fastened together, preferably in groups of three, by strapping or other suitable means and protected with a geotextitle fabric. The mat is then placed over the set of pipes and anchored at the onshore side of the pipes, with the pipes laterally facing the wave action.

21 Claims, 8 Drawing Sheets

MAT INSTALLATION

FIELD OF THE INVENTION

The present invention relates to mats. More particularly, the present invention relates to raising the elevation of mats that stabilize and protect shoreline, stream and river erosion.

BACKGROUND OF THE INVENTION

Articulated mats are used for offshore coastal and marine applications where separation, stabilization, protection and scour prevention is needed for pipelines and other installations submerged and partially submerged, and where shoreline, stream and river erosion protection is needed. These mats are particularly useful in areas where considerable hydrodynamic forces are generated by bottom currents and waves. Thus, for example, a seabed pipeline can be covered with such a mat so that the pipeline is stabilized by the weight of the mat. Examples of articulated mats, their components, and their uses are given in European patent specification 0152232, and U.S. Pat. Nos. 2,876,628; 2,674,856; 4,370,075; 4,357,928; 4,417,828; 5,052,859; and 5,193,937.

The most effective soil covering is concrete because of its high tensile and compressive strength and its almost endless resistance to the action of natural types of water, including slowing the water velocity. Unfortunately, concrete is hard and heavy. To help prevent erosion it may be necessary to raise the elevation of the concrete mat normally used in the art to increase the performance of the mat for high tides, high wave action, tide surges and the like. However, if several inches of rock, concrete or other heavy revetment is placed on a soft shoreline, such as the Louisiana coastal and marsh beaches which in some places are very soft organic soil with vegetation growing in close proximity to the shoreline, the entire height of the material may be settled into the soil.

There is therefore a need in the art for raising the elevation of a concrete mat to increase the performance of the mat to permit the revetment system to function better in high tides, high wave action and tide surges, for example, without adding substantial weight.

SUMMARY OF THE INVENTION

To raise the height or elevation of an articulating concrete mat, the present invention provides a polymer pipe, such as PVC pipe or the equivalent, banded or strapped together in modular units of at least three pipes. The modules are then assembled into larger units to match the height and width of the structure required by the design of the elevated articulating concrete mat. The pipe is held together by strapping tape, plastic or stainless steel banding material. The pipe may be perforated to increase the drainage of water from the structure, and improve retention of earth under the mat.

After the sets of pipe are banded in a final configuration, the entire structure can optionally be wrapped with a geotextile fabric. The geotextile fabric is taped, stapled or sewn together at the seams securing the fabric around the pipes. The geotextile fabric helps slow water velocity and assists in accumulation of sediment behind the structure. The geotextile fabric also prevents the accumulation of sediments in the structure and shields the PVC pipe from ultraviolet rays, preventing degradation of the PVC pipe.

The assembled structures are first placed on the beach, streambed or the like and then the articulating concrete mat is draped over the assembled structure. The mat is anchored as required to prevent movement. The structure will raise the elevation of the concrete mat to increase the performance of the mat.

BRIEF DESCRIPTION OF THE DRAWINGS

For a further understanding of the nature and objects of the present invention, reference should be had to the following detailed description taken in conjunction with the following drawings in which like parts are given like reference numerals and wherein.

DETAILED DESCRIPTION OF THE PREFERRED EMBODIMENT

The primary purpose of the present invention is to use certain articulated concrete mats having non-abrasive pads disposed on at least a portion of the faces of the elements for revetment structures. The present invention can be used to protect other natural and artificial structures from water action, or weather action, where increased elevation is required of a large surface area. For purposes of the preferred embodiment, a new type of concrete element mat will be shown as the preferred mat 100 to be used with the mat installation 101. However, such mats 100 should not be considered restrictive of the present invention, but merely illustrative of the type of mats that can be used in the present invention.

Figure 1:
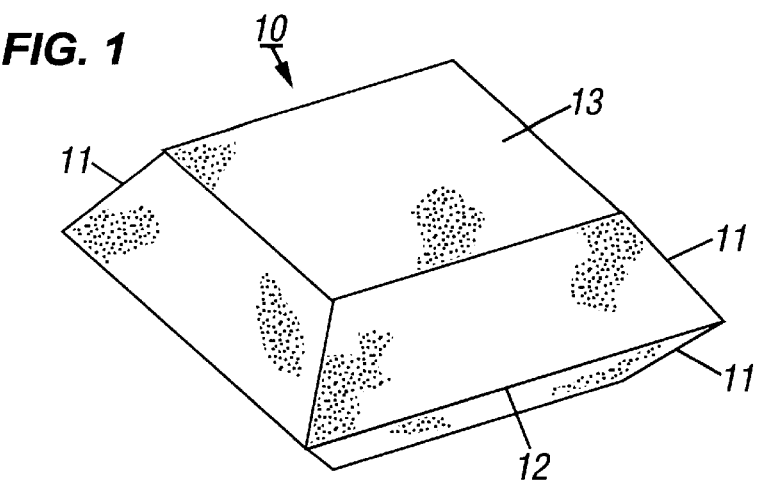
FIG. 1 is a perspective view of a single concrete element of the preferred mat used with the present invention.
Figure 2:
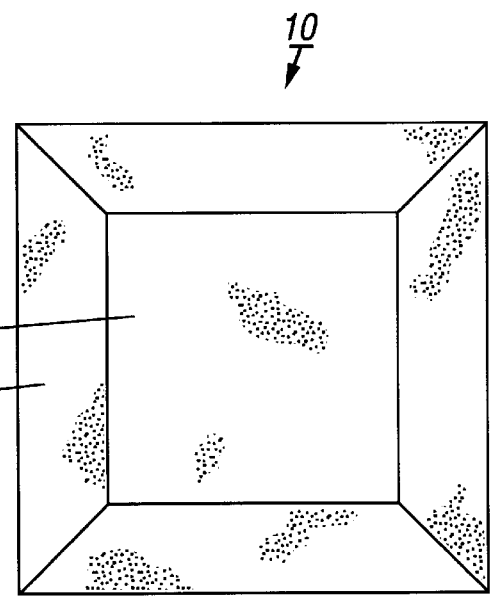
FIG. 2 is a top view of a single concrete element of the preferred mat used with the present invention.
Figure 3:
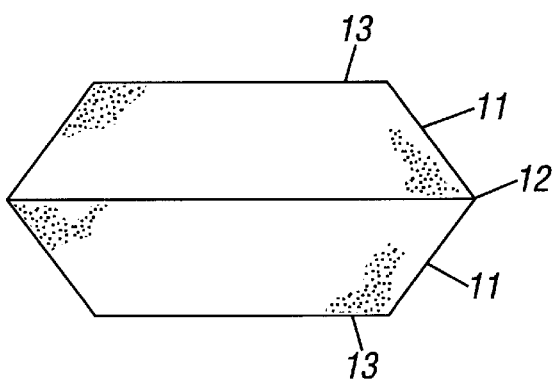
FIG. 3 is a side view of a single concrete element of the preferred mat used with the present invention.

The primary component of the mat 100 is a concrete element. Although there are a number of suitable shapes in the prior art, the preferred embodiment of the mat is shown in FIG. 1. The best shape for the concrete element 10 is two symmetrically opposed pyramids 11. The common rectangular base of the two opposing pyramids 11 form the center 12 of the concrete element 10. Each of the pyramids 11 is truncated at its top to form a face 13 as shown in FIGS. 1–3.

Figure 7:
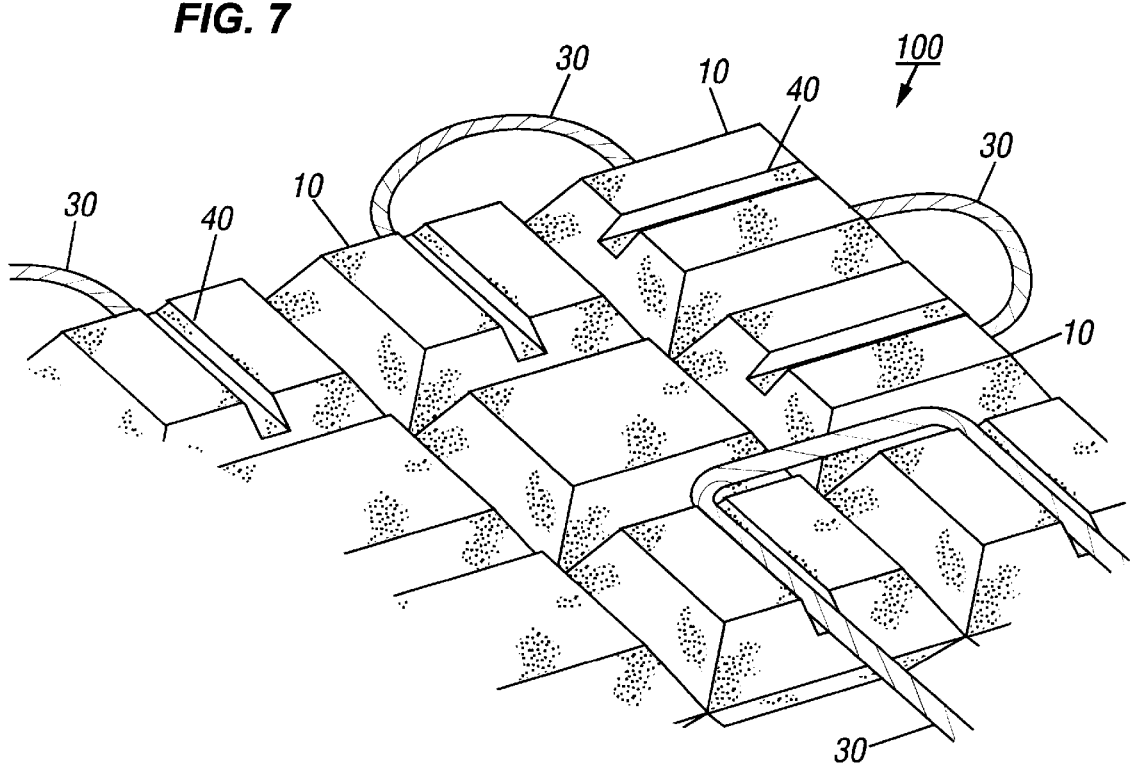
FIG. 7 is a perspective view of a corner portion of the subsea mat of the preferred mat used with the present invention.

To make a useful mat 100, the concrete elements 10 are arranged in a row and column array as shown in FIG. 7. A flexible rope 20 is used to attach the concrete elements 10 to one another. The rope can be made of a polymer or copolymer materials or be biodegradable. In the preferred embodiment the rope should be capable of withstanding at least an initial pressure of 8000 psi without breaking for mat movement and placement purposes and further the rope must be capable of being embedded in the wet concrete during the mat making process.

Figure 4:
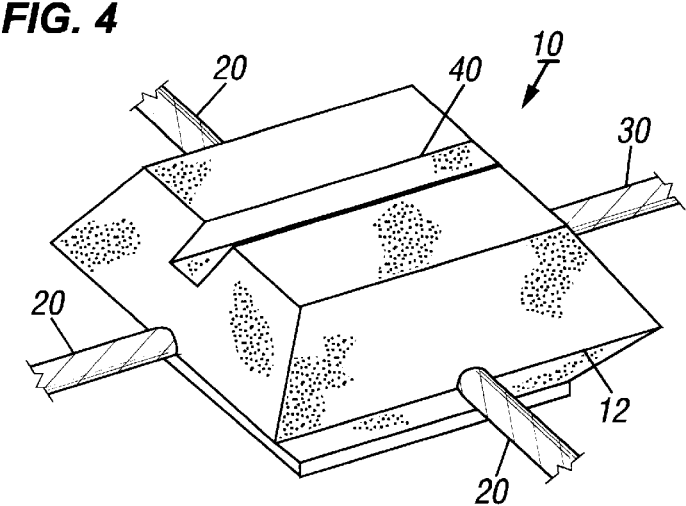
FIG. 4 is a perspective view of a single concrete edge element of the preferred mat used with the present invention.
Figure 5:
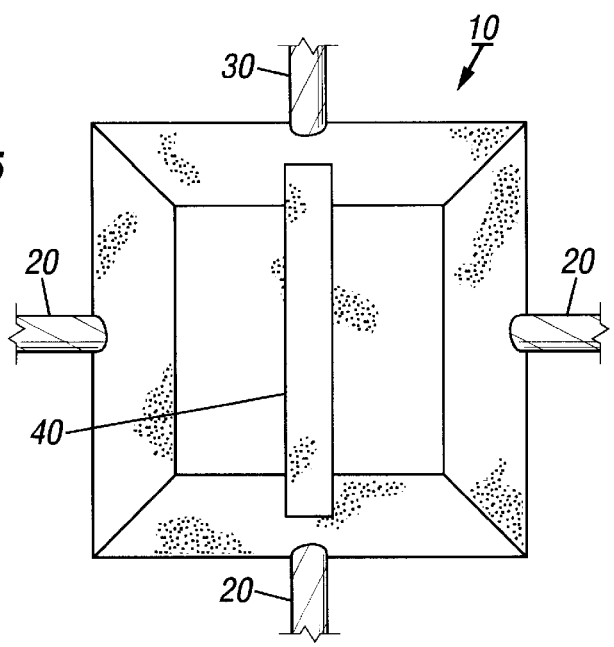
FIG. 5 is a top view of a single concrete edge element of the preferred mat used with the present invention.
Figure 6:
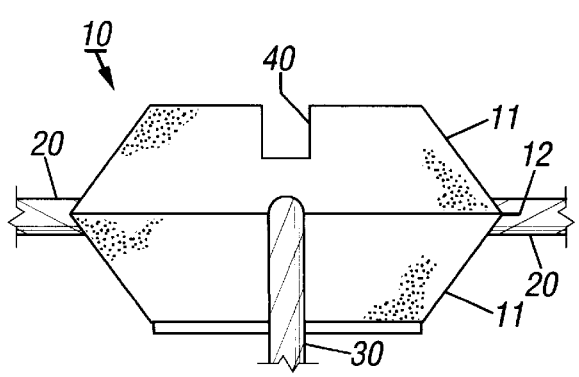
FIG. 6 is a side view of a single concrete edge element of the preferred mat used with the present invention.

The rope 20 is preferably embedded in the concrete so as to leave a small loop 30 at the exit and entrance of alternating rows and columns in the rope grid layout as shown in FIGS. 4 and 7. These small loops 30 are used to facilitate the handling and transportation of the mat 100 and aid in anchoring the mat installation 101.

Figure 8:
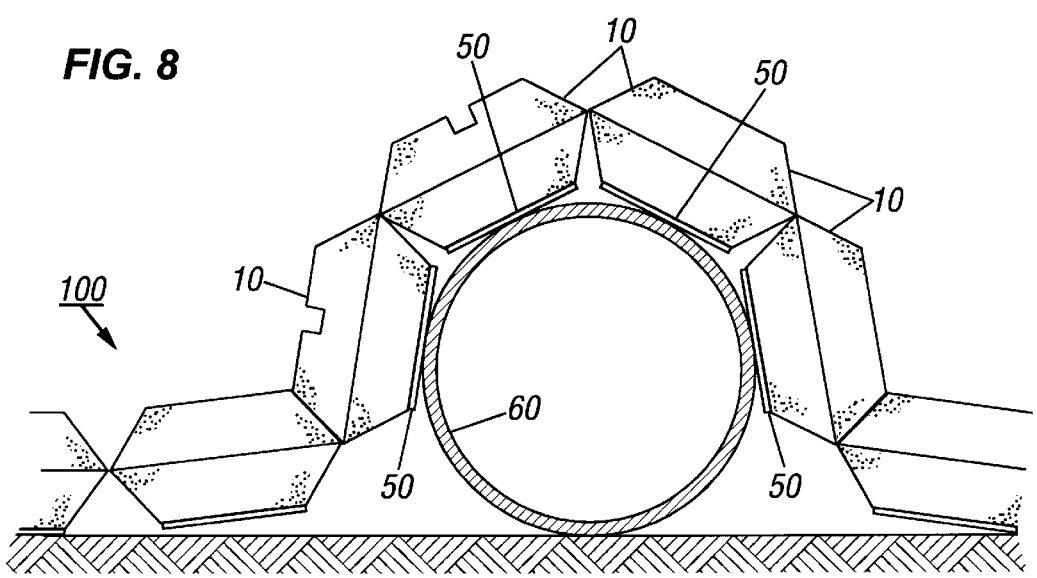
FIG. 8 is a side view of the preferred mat used with the present invention covering an underwater installation.
Figure 9:
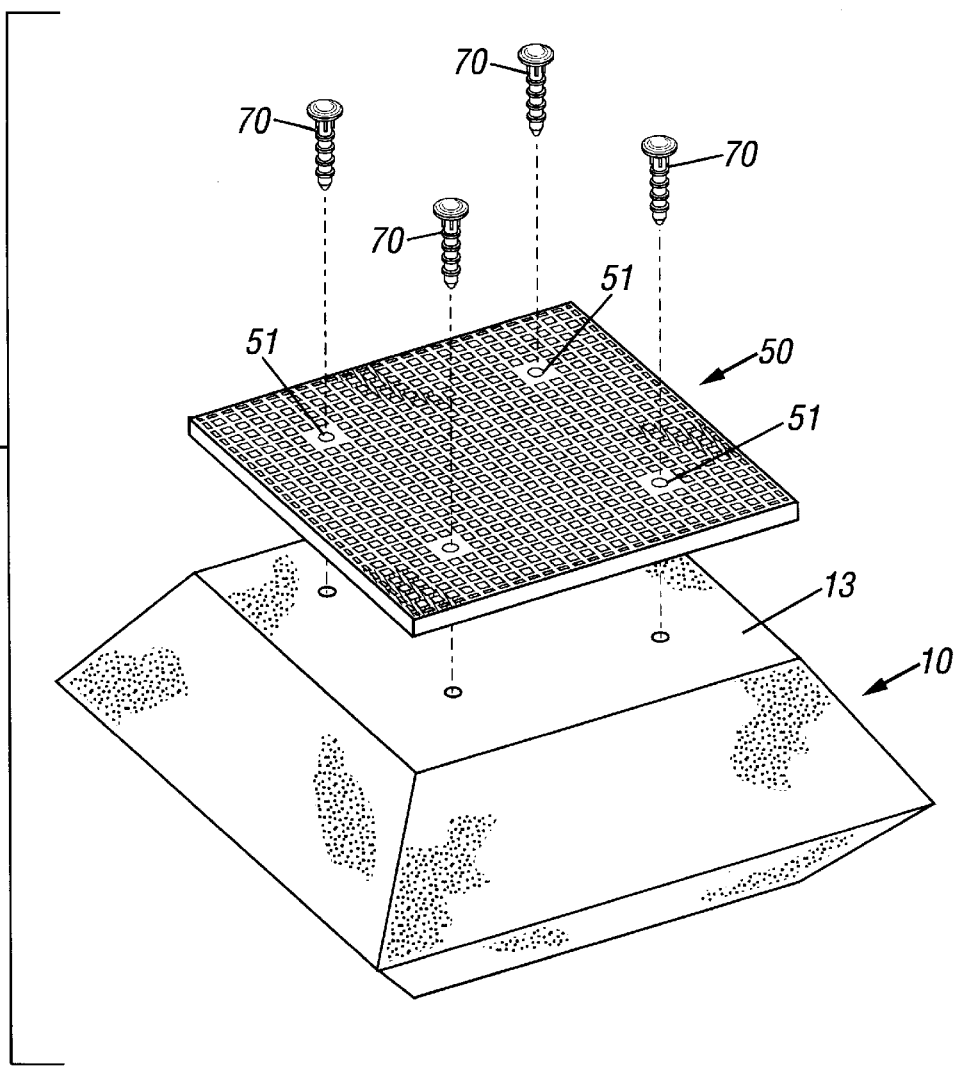
FIG. 9 is a perspective view of the assembly of the non-abrasive pad onto a single concrete element of the preferred mat used with the present invention.

As mentioned before, the purpose of the unique mat used in the present invention is the protection of and the stabilization of the shoreline, seabed, riverbed, and the like (not shown). Some installations may optionally use a non-abrasive pad 50 attached to at least one face 13 of the concrete element 10 as shown in FIG. 9. The non-abrasive pad 50 is situated between the concrete element 10 and the installation 60 which can be a subsea or totally submerged installation as shown in FIG. 8 or a partially submerged installation. It is contemplated that the structure may be visible for holding back dirt and grass in non-aqueous environments. The mat 100 with pad 50 is constructed so as to permit ion flow through the pad in water to the installation, if it is metallic. This ion flow through improves cathodic protection of the installation if it is a metal pipeline or similar material. The mat may be constructed with the non-abrasive pad affixed to it with fasteners which are embedded through the mat and into the concrete while still wet. The mat is then used with a novel frame system for disposing these protective mats with non-abrasive pads onto underwater installations or by helicopter to semisubmerged installations. The best material for the non-abrasive pad 50 is low-density polyethylene ("LDPF") although polyvinyl chloride ("PVC") and nylon also work well. Any polymer substance capable of sustaining weight for concrete elements can be used for the pad, as long as it remains flexible at cold temperatures such as ocean depths of at least 2500 feet. As the pads 50 have no appreciable affect on the seabed, the pads 50 may be eliminated from those elements 10 which would not come in contact with the installation 60. In the preferred embodiment of the mat, each of the elements 10 are fitted with a pad 50 so that any portion of the mat may be placed onto the installation 60.

Figure 10:
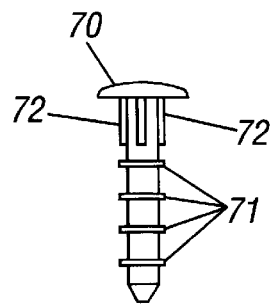
FIG. 10 is a nylon fastener used to attach a non-abrasive pad onto a concrete element of the preferred mat used with the present invention.

As shown in FIG. 9, the non-abrasive pad 50 is attached to the concrete element 10 by fasteners 70 at the hole 51 of the non-abrasive pad 50. A profile of a fastener 70 is shown in FIG. 10. Although the fasteners 70 may be placed into the element 10 by a variety of means, it is best to form the concrete element 10 around the fastener 70 to provide the most secure attachment of the non-abrasive pad 50 to the element 10.

Figure 13:
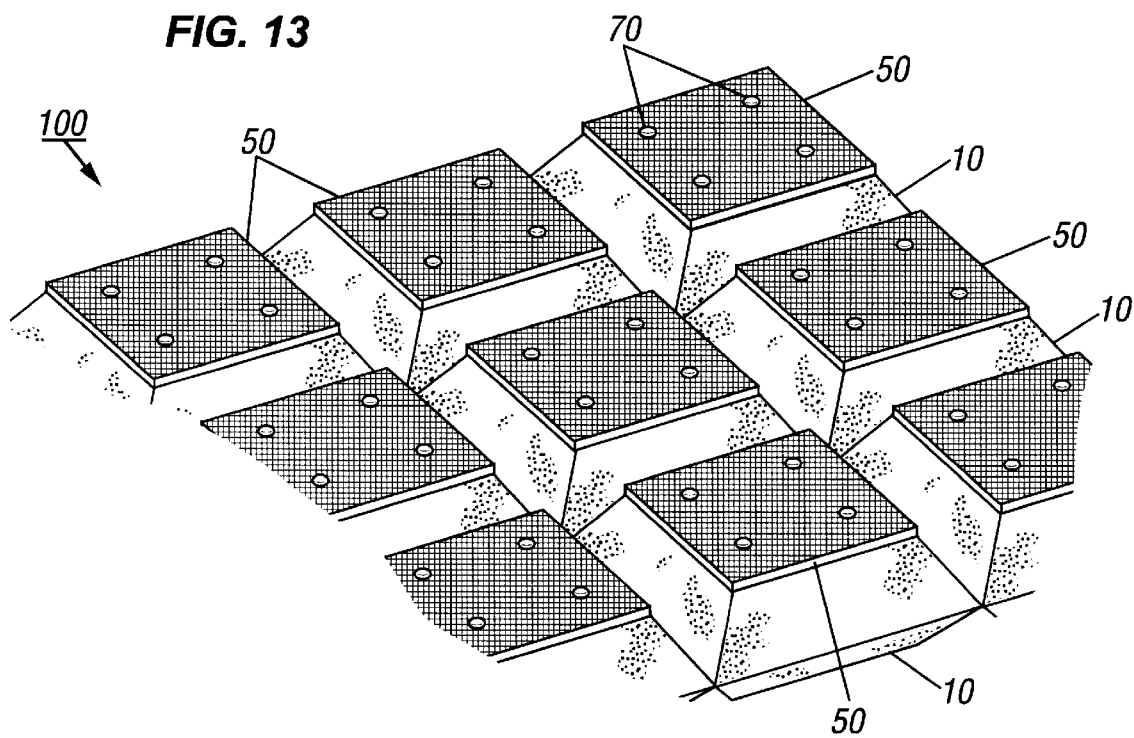
FIG. 13 is a perspective view of the subsea mat, with non-abrasive pad, of the preferred mat used with the present invention.
Figure 14:
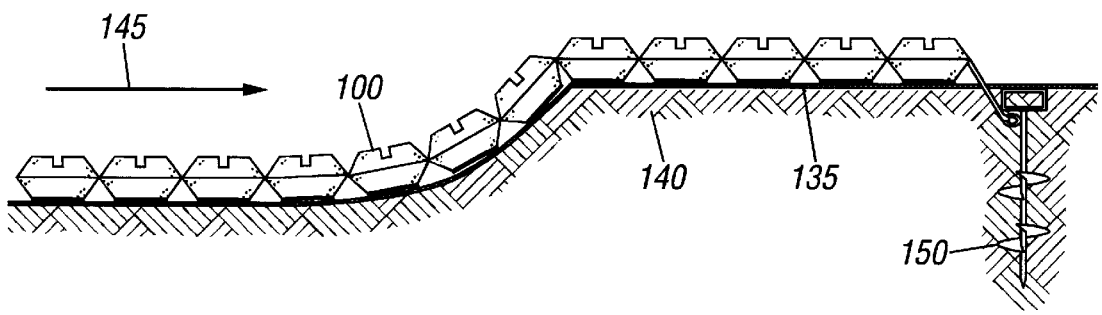
FIG. 14 is a cross-section view of a prior art mat installation but using an anchor of the preferred embodiment.

The best material for the fastener 70 is nylon. Suitable materials are polyvinyl chloride (PVC) and low density polyethylene (LDPE). Once again, the fastener, like the pad, must be capable of resisting brittleness at temperatures and pressures found in cold climates or ocean depths of at least 2500 feet of water. Other non-metallic materials can be substituted for nylon if those materials are not abrasive to the installation and the substitute material does not deteriorate significantly in sea water or become brittle at low temperatures or high pressures. In the most advantageous configuration, four fasteners are fitted onto each non-abrasive pad 50 and the concrete element 10 is formed around the fasteners ribs 71 of the fastener 70. In the preferred embodiment, each element 10 is fitted with a non-abrasive pad 50 on one face 13 as shown in FIG. 13.

Figure 11:
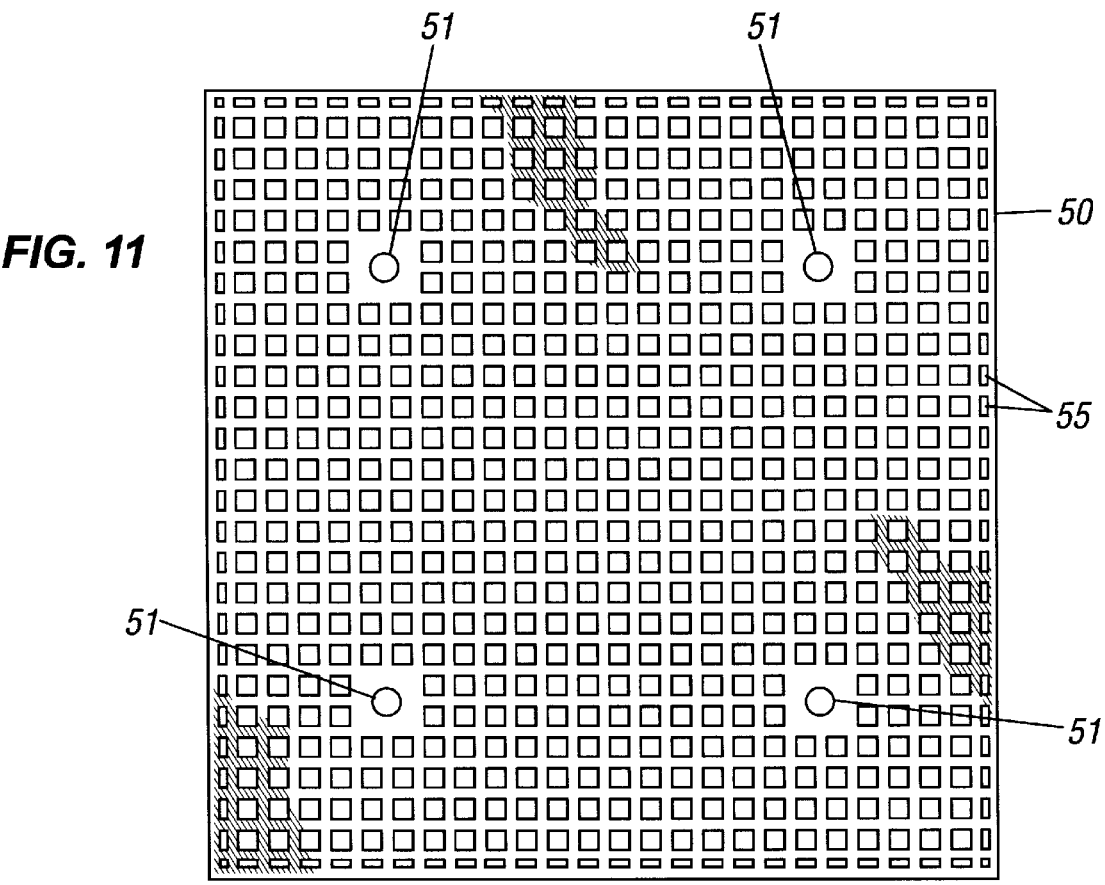
FIG. 11 is a top view of the non-abrasive pad of the preferred mat used with the present invention.
Figure 12:
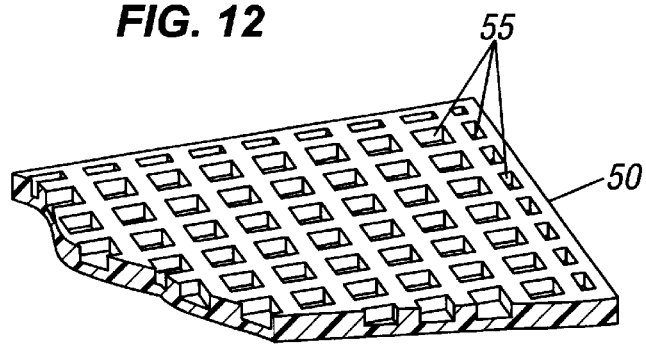
FIG. 12 is a partial perspective view of the non-abrasive pad of the preferred mat used with the present invention.

A typical non-abrasive pad 50 is shown in FIGS. 11 and 12. Pad 50 is fitted with four fastener holes 51 which allow the fastener 70 to be fitted onto the pad 50 as shown in FIG. 9. In the preferred embodiment the mat is attached to the concrete element using the fasteners 70 while still wet. In the optimum configuration, pad 50 contains an array of openings 55 as shown in FIGS. 11 and 12. The openings 55 serve a dual function. They allow the ions to flow through the nonabrasive pad to metal installations, if the invention is placed over the installation, preventing rusting, corrosion or similar deterioration of the installation, and causing cathodic protection of the metallic structure.

Figure 15:
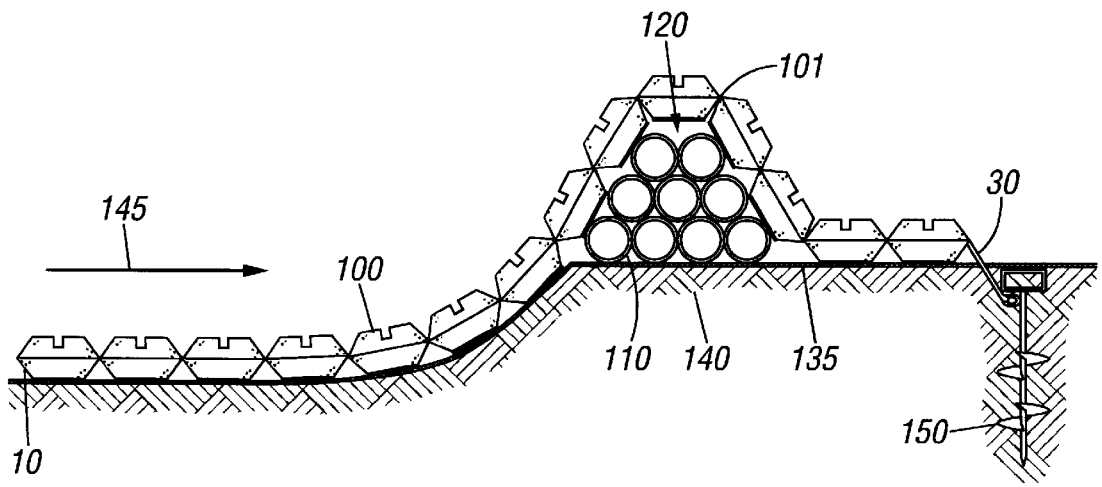
FIG. 15 is a cross sectional of the preferred embodiment of the present invention.
Figure 16:
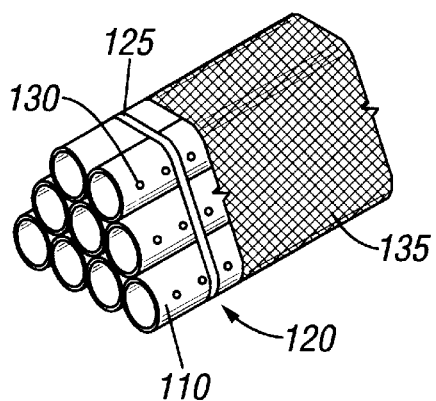
FIG. 16 is a detail perspective view marked as "B" in FIG. 15 of the preferred embodiment of the present invention showing the set of pipe assembled.
Figure 17:
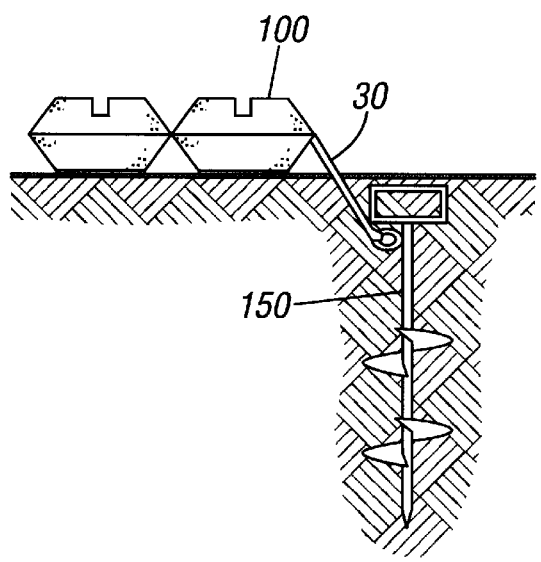
FIG. 17 is a detail marked as "A" of FIG. 14 of the preferred embodiment of the present invention showing the anchor.
Figure 18:
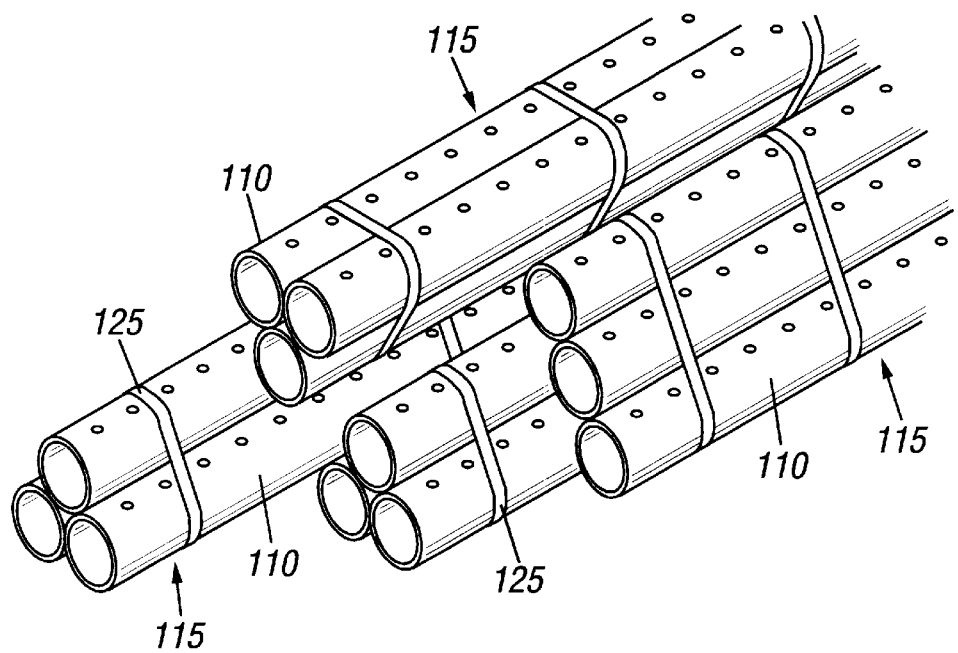
FIG. 18 is a nonassembled detail perspective view marked as "B" of FIG. 15 of the preferred embodiment of the present invention showing the groups of pipe which may be used to form the set of the pipe assembly.

To raise the height or elevation of an articulating concrete mat 100, as shown in FIG. 15, the present invention provides PVC pipe 110, such as four inch outer diameter, perforated PVC pipe, or the equivalent, cut so as to have the same width as the mat 100, than banded or strapped together in modular groups 115 of at least three pipes 110 and up to 9 pipes. The moduler group can be assembled into larger sets 120 to match the height and width of the structure required by the design of the elevated articulating concrete mat installation 101. The pipe 110 is held together by strapping tape, plastic or stainless steel banding material 125. The pipe 110 may be perforated by perforations 130 to increase the drainage of water from the structure and prevent erosion. The whole structure is less costly than most revetment processes currently available. As shown in FIG. 18, the three triangular shaped groups 115 of pipe 110 may be easily banded together by band 125 into a single set 120 of pipe, the set 120 as shown in FIG. 16. FIG. 18 also showed a linear set 115 of three pipes 110 in a bundle to illustrate some modules which are not triangular, but flat from an end view.

After the sets 120 of PVC pipe 110 are banded in a final configuration, the entire structure of the preferred embodiment 120 is wrapped with a geotextile fabric 135. The geotextile fabric 135 is taped, stapled or sewn together at the seams to secure snugly around the pipes. The geotextile fabric 135 helps slow water velocity and assists in accumulation of sediments behind the structure. The geotextile fabric 135 also prevents the accumulation of sediments in the structure and shields the PVC pipe 110 from ultraviolet rays which can degrade the pipe. It is possible to create an installation without the geotextitle fabric as an alternative embodiment.

The assembled structures 120 with the geotextile fabric 135 are first placed on the beach, streambed or the like 140 with the structure 120 placed laterally with respect to wave action or current flow 145. Then the articulating concrete mat 100 is draped over the PVC structure 120 to form the mat installation 101. The mat 100 is anchored as required by anchor 150 connected to a loop 30 to prevent movement. The anchor 150 is preferably a double helix anchor used at the top corner of each mat 100. The pipe structure 120 will raise the elevation of the concrete mat 100 to increase the performance of the mat 100. The heading elements 10 of mat 100 may toe in for anchorage as well.

Although the present invention is described and illustrated above with detailed reference to the preferred embodiment, the invention is not limited to the details of such embodiment but is capable of numerous modifications, by one of ordinary skill in the art, within the scope of the following claims.

We claim:

1. A mat installation for stabilizing and protecting shoreline comprising:
   a plurality of elements wherein each of said elements has the shape of two symmetrically opposed pyramids, each of said pyramids having a truncated top forming a face, each of said pyramids further having a common rectangular base that forms a center of said element, said elements arranged in parallel rows and columns with sufficient space between each of said elements to allow adjacent elements to conform to an uneven installation;
   a flexible rope, said rope constructed and arranged to pass through said center of each of said elements in two directions and embedded therein to fasten said elements to each other by said rows and by said columns;
   a set of perforated, hollow pipes having sides; and
   a strap, said strap wrapped around the exterior of said pipes,
   said plurality of elements covering the sides of said pipes.

2. The mat installation according to claim 1, wherein there is further included a geotextile fabric, said fabric being located between said elements and said pipes.

3. The mat installation according to claim 1, further comprising a non-abrasive pad attached to at least one face of said plurality of elements which are disposed over said perforated hollow pipes.

4. The mat installation of claim 2, wherein said each of said pipes is PVC pipe.

5. The mat installation of claim 1, wherein said rope includes a small loop at the exit and entrance of alternating rows and alternating columns for the purpose of handling said elements during transportation and installation.

6. The mat installation of claim 4, wherein there is further included an anchor, said anchor being attached to one of said small loops.

7. The mat installation of claim 4, wherein said pipes are between 2 and 9 in number.

8. The mat installation of claim 5 wherein at least one of said elements further has a groove, said groove constructed and arranged to allow said loop of a second mat to be placed into said groove in order to attach said second mat to said mat.

9. The mat installation of claim 1, wherein said set of perforated pipes include at least one group of three pipes having a strap.

10. The mat installation of claim 9, wherein said group is triangular in cross section.

11. A method of making a mat installation for protecting and stabilizing earth from surging water comprising the steps of:
    providing a plurality of concrete elements wherein each of said elements has the shape of two symmetrically opposed pyramids, each of said pyramids having a truncated top forming a face, each of said pyramids further having a common rectangular base that forms a center of said element, said elements arranged in parallel rows and columns with sufficient space between each of said elements to allow adjacent elements to conform to uneven installations;
    lacing a rope through said concrete elements so that said rope is embedded in said elements after the concrete has solidified in order to fasten said elements to each other in a row and column array with sufficient space between each element to allow adjacent elements to conform to uneven ground installations; and
    laying said interconnected elements over a wrapped set of perforated pipe, said pipe having its lateral sides facing the surging water.

12. A method for making a mat installation according to claim 10, further comprising the step of affixing integrally to said plurality of concrete elements at least on the faces which will connect to the installation to be stabilized a non-abrasive pad.

13. A method for making a mat installation according to claim 10 comprising the additional steps of:
    forming loops at the entrance and exit of alternating rows and columns of said elements;
    forming a groove on at least one of said elements, said groove constructed and arranged to allow said loop of a second mat to be placed into said groove in order to attach said second mat to said mat; and
    anchoring the installation through a loop.

14. A method of making a mat installation for protecting shoreline from surging water comprising the steps of:
    providing a plurality of concrete elements wherein each of said elements has the shape of two symmetrically opposed pyramids, each of said pyramids having a truncated top forming a face, each of said pyramids further having a common rectangular base that forms a center of said element, said elements arranged in parallel rows and columns with sufficient space between each of said elements to allow adjacent elements to conform to uneven ground installations; and
    lacing a rope through said concrete elements so that said rope is embedded in said elements after the concrete has solidified in order to fasten said elements to each other in a row and column array with sufficient space between each element to allow adjacent elements to conform to uneven ground installations:
    placing a geotextitle fabric over the installation to be protected; and
    disposing the elements over a set of perforated pipe which has been further wrapped in geotextitle fabric.

15. A method for making a mat according to claim 12 comprising the additional steps of:
    forming loops at the entrance and exit of alternating rows and columns of said elements;
    forming a groove on at least one of said elements, said groove constructed and arranged to allow said loop of a second mat to be placed into said groove in order to attach said second mat to said mat; and
    anchoring the installation through a loop.

16. A mat installation for stabilizing and protecting shoreline comprising:
    a plurality of elements wherein each of said elements has the shape of two symmetrically opposed pyramids, each of said pyramids having a truncated top forming a face, each of said pyramids further having a common rectangular base that forms a center of said element, said elements arranged in parallel rows and columns with sufficient space between each of said elements to allow adjacent elements to conform to uneven ground installations;

a non-abrasive mat having holes to permit ion flow in aqueous environments integrally affixed to each face of said element which contacts said mat installation;

a flexible rope, said rope constructed and arranged to pass through said center of each of said elements in two directions and embedded therein to fasten said elements to each other by said rows and by said columns;

a set of PVC, hollow pipes having sides;

a strap, said strap wrapped around the exterior of said pipes; and said plurality of elements covering the sides of said pipes.

17. The mat installation according to claim 16, wherein there is further included a geotextile fabric, said fabric located between said elements and said pipes.

18. The mat installation of claim 17, wherein said each of said pipes is a perforated pipe.

19. The mat installation of claim 18, wherein there is further included an anchor, said anchor being attached to one of said small loops.

20. The mat installation of claim 16, wherein said set of PVC pipes include at least one group of three pipes having a strap.

21. The mat installation of claim 20, wherein said group is triangular in cross section.

* * * * *